United States Patent
Ogawa

(10) Patent No.: US 11,363,219 B2
(45) Date of Patent: Jun. 14, 2022

(54) INFORMATION PROCESSING APPARATUS, IMAGE SENSOR, IMAGE CAPTURING APPARATUS, AND INFORMATION PROCESSING METHOD

(71) Applicant: CANON KABUSHIKI KAISHA, Tokyo (JP)

(72) Inventor: Takeshi Ogawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/813,058

(22) Filed: Mar. 9, 2020

(65) Prior Publication Data

US 2020/0296307 A1  Sep. 17, 2020

(30) Foreign Application Priority Data

Mar. 12, 2019  (JP) .............................. JP2019-045134

(51) Int. Cl.
*H04N 5/357* (2011.01)

(52) U.S. Cl.
CPC .................................. *H04N 5/357* (2013.01)

(58) Field of Classification Search
CPC .... H04N 5/357; H04N 5/361; H04N 5/37455; H04N 5/378; H04N 5/3355; H04N 5/374; H04N 5/3756; H04N 3/379; H04N 5/35554; H04N 5/3745; H04N 3/3535; H04N 5/35536; H04N 5/35545; H04N 5/3559; H04N 5/235; H04N 5/341; H04N 5/347; H04N 5/3532; H04N 5/3537; H04N 5/35572; H04N 5/35581; H04N 5/359; H04N 5/365; H04N 5/37452; H04N 5/12; H04N 5/232122; H04N 5/23254; H04N 5/23267; H04N 5/2355; H04N 5/335; H04N 5/3456; H04N 5/351; H04N 5/355; H04N 5/3575; H04N 5/3577; H04N 5/3594; H04N 5/36961; H04N 5/3741; H04N 5/3742; H04N 5/376

See application file for complete search history.

(56) References Cited

U.S. PATENT DOCUMENTS

| | | | |
|---|---|---|---|
| 8,269,869 B2 * | 9/2012 | Ohki | .................. H04N 5/37455 348/297 |
| 9,374,541 B2 * | 6/2016 | Nishihara | ......... H01L 27/14627 |
| 9,667,898 B2 * | 5/2017 | Vogelsang | ......... H04N 5/35545 |

(Continued)

FOREIGN PATENT DOCUMENTS

| | | |
|---|---|---|
| JP | 07-067043 A | 3/1995 |
| JP | 2011-071958 A | 4/2011 |

*Primary Examiner* — Michael S Osinski
(74) *Attorney, Agent, or Firm* — Cowan, Liebowitz & Latman, P.C.

(57) ABSTRACT

An information processing apparatus comprises: a correction unit that sequentially inputs count values of a plurality of pixels from an image sensor and corrects the input count values, the image sensor having the plurality of pixels each of which has a sensor that outputs a pulse signal in response to an incident of a photon and a counter that counts the number of pulse signals. In a case where a count value reaches a maximum value, the counter resets the count value to 0 and continues counting, and, in a case were an input count value is obtained by continuing counting after the count value is reset to 0, the correction unit corrects the input count value.

17 Claims, 9 Drawing Sheets

(56) References Cited

U.S. PATENT DOCUMENTS

| | | | |
|---|---|---|---|
| 10,091,430 B2* | 10/2018 | Sakane | H04N 5/232122 |
| 10,116,320 B2* | 10/2018 | Hashimoto | H03M 1/34 |
| 10,594,973 B2* | 3/2020 | Vogelsang | H04N 5/3765 |
| 2001/0048466 A1* | 12/2001 | Takami | H04N 7/188 |
| | | | 348/65 |
| 2007/0188645 A1* | 8/2007 | Horii | H04N 5/12 |
| | | | 348/333.01 |
| 2008/0218614 A1* | 9/2008 | Joshi | H04N 5/35572 |
| | | | 348/262 |
| 2008/0224913 A1* | 9/2008 | Suzuki | H04N 5/217 |
| | | | 341/155 |
| 2008/0253498 A1* | 10/2008 | Dupont | G01J 5/24 |
| | | | 377/19 |
| 2008/0284885 A1* | 11/2008 | Taura | H04N 5/3575 |
| | | | 348/300 |
| 2009/0109315 A1* | 4/2009 | Taura | H03M 1/56 |
| | | | 348/311 |
| 2009/0167586 A1* | 7/2009 | Shimomura | H03M 1/125 |
| | | | 341/169 |
| 2010/0245639 A1* | 9/2010 | Mori | H04N 5/374 |
| | | | 348/294 |
| 2011/0242383 A1* | 10/2011 | Yamazaki | H04N 5/3532 |
| | | | 348/302 |
| 2011/0291019 A1* | 12/2011 | Yuan | G01T 1/247 |
| | | | 250/370.09 |
| 2012/0104233 A1* | 5/2012 | Mori | H03M 1/1019 |
| | | | 250/208.1 |
| 2012/0138772 A1* | 6/2012 | Hagihara | H04N 5/37455 |
| | | | 250/208.1 |
| 2012/0176501 A1* | 7/2012 | Yoo | H03M 1/164 |
| | | | 348/207.1 |
| 2012/0307120 A1* | 12/2012 | Ito | H04N 5/378 |
| | | | 348/302 |
| 2013/0134296 A1* | 5/2013 | Hagihara | H01L 27/146 |
| | | | 250/208.1 |
| 2013/0335609 A1* | 12/2013 | Higuchi | H03M 1/145 |
| | | | 348/302 |
| 2015/0036005 A1* | 2/2015 | Kelly | H04N 5/2355 |
| | | | 348/208.1 |
| 2015/0042856 A1* | 2/2015 | Nakamura | H04N 5/378 |
| | | | 348/297 |
| 2015/0256774 A1* | 9/2015 | Nishihara | H01L 27/14612 |
| | | | 348/216.1 |
| 2015/0281613 A1* | 10/2015 | Vogelsang | H04N 5/37455 |
| | | | 348/300 |
| 2017/0330509 A1* | 11/2017 | Cok | G09G 3/2014 |
| 2018/0288344 A1* | 10/2018 | Chu | H04N 5/23241 |
| 2019/0132531 A1* | 5/2019 | Nishida | H04N 5/357 |
| 2019/0182442 A1* | 6/2019 | Ikedo | H04N 5/37455 |
| 2019/0189827 A1* | 6/2019 | Haraguchi | H01L 27/14643 |
| 2019/0364237 A1* | 11/2019 | Yeo | H04N 5/341 |
| 2020/0045251 A1* | 2/2020 | Koizumi | H01L 27/14627 |
| 2020/0058341 A1* | 2/2020 | Villa | G11C 11/2273 |
| 2020/0349995 A1* | 11/2020 | Shore | G11C 11/406 |
| 2020/0382726 A1* | 12/2020 | Inaoka | H01L 27/14627 |
| 2021/0044768 A1* | 2/2021 | Kuroda | H04N 5/35563 |
| 2021/0385402 A1* | 12/2021 | Zhu | H04N 5/3745 |

* cited by examiner

INFORMATION PROCESSING APPARATUS, IMAGE SENSOR, IMAGE CAPTURING APPARATUS, AND INFORMATION PROCESSING METHOD

BACKGROUND OF THE INVENTION

Field of the Invention

The present invention relates to an information processing apparatus, an image sensor, an image capturing apparatus, and an information processing method.

Description of the Related Art

Conventionally, as a technique of an image sensor that can reduce the deterioration of the S/N ratio due to switching noise, stray capacitance, and the like, there has been a technique of converting an analog signal into a digital signal within a pixel.

For example, Japanese Patent Laid-Open No. 7-67043 discloses an image sensor having a mechanism for counting pulses generated in response to incident photons by a counting device in a pixel.

Further, Japanese Patent Laid-Open No. 2011-71958 discloses an imaging device and a camera system that can realize optimization of exposure settings when a time-division photon counting technique is used.

However, in the prior art disclosed in the above-mentioned Japanese Patent Laid-Open Nos. 7-67043 and 2011-71958, a counter for counting the number of photons is arranged in each pixel, and if the number of bits of the counter is increased in order to obtain a high dynamic range, the size of the pixel also increases, which not only makes it difficult to reduce the size and improve definition of an image sensor, but also increases the cost since the amount of wiring and power increase.

SUMMARY OF THE INVENTION

The present invention has been made in consideration of the above situation, and expands the dynamic range without increasing the number of bits of a counter in each pixel.

According to the present invention, provided is an information processing apparatus comprising one or more processors and/or circuitry which functions as: a correction unit that sequentially inputs count values of a plurality of pixels from an image sensor and corrects the input count values, the image sensor having the plurality of pixels each of which has a sensor that outputs a pulse signal in response to an incident of a photon and a counter that counts the number of pulse signals, wherein, in a case where a count value reaches a maximum value, the counter resets the count value to 0 and continues counting, and wherein, in a case were an input count value is obtained by continuing counting after the count value is reset to 0, the correction unit corrects the input count value.

Further, according to the present invention, provided is an image sensor including a plurality of pixels, each of which comprising: a sensor that outputs a pulse signal in response to incident of a photon; and a counter that counts the number of pulse signals, wherein, in a case where a count value reaches a maximum value, the counter resets the count value to 0 and continues counting.

Furthermore, according to the present invention, provided is an image capturing apparatus comprising: an image sensor including a plurality of pixels, each of which comprising: a sensor that outputs a pulse signal in response to incident of a photon; and a counter that counts the number of pulse signals, wherein, in a case where a count value reaches a maximum value, the counter resets the count value to 0 and continues counting; and an information processing apparatus comprising one or more processors and/or circuitry which functions as: a correction unit that sequentially inputs count values of a plurality of pixels from the image sensor and corrects the input count values, wherein, in a case where a count value reaches a maximum value, the counter resets the count value to 0 and continues counting, and wherein, in a case were an input count value is obtained by continuing counting after the count value is reset to 0, the correction unit corrects the input count value.

Further, according to the present invention, provided is an information processing method comprising: sequentially inputting count values of a plurality of pixels from an image sensor having the plurality of pixels each of which has a sensor that outputs a pulse signal in response to an incident of a photon and a counter that counts the number of pulse signals, correcting the input count values, wherein, in a case where a count value reaches a maximum value, the count value is reset to 0 and the counting is continued, and wherein, in a case were an input count value is obtained by continuing counting after the count value is reset to 0, the input count value is corrected.

Further, according to the present invention, provided is a non-transitory computer-readable storage medium, the storage medium storing a program that is executable by the computer, wherein the program includes program code for causing the computer to function as an image processing apparatus comprising one or more processors and/or circuitry which functions as: a correction unit that sequentially inputs count values of a plurality of pixels from an image sensor and corrects the input count values, the image sensor having the plurality of pixels each of which has a sensor that outputs a pulse signal in response to an incident of a photon and a counter that counts the number of pulse signals, wherein, in a case where a count value reaches a maximum value, the counter resets the count value to 0 and continues counting, and wherein, in a case were an input count value is obtained by continuing counting after the count value is reset to 0, the correction unit corrects the input count value.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Figure 1:
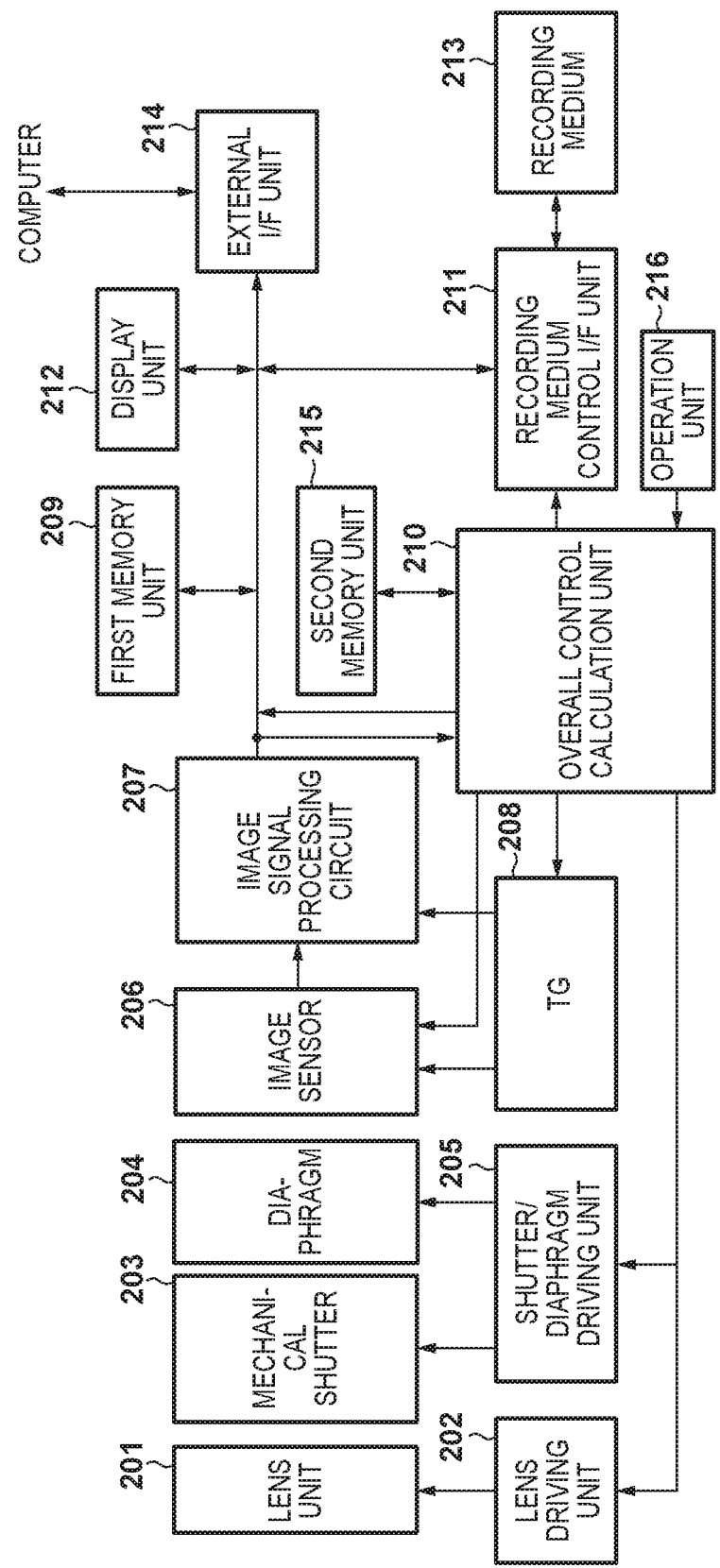
FIG. 1 is a block diagram illustrating a schematic configuration of an image capturing apparatus according to first and second embodiments.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Hereinafter, an image sensor and a signal processing apparatus according to a first embodiment of the present invention will be described.

FIG. 1 is a block diagram illustrating a schematic configuration of an image capturing apparatus according to the first embodiment. In FIG. 1, a lens unit 201 includes a plurality of lenses including a zoom lens, and the focal length can be changed from the wide-angle end to the telephoto end under control of a lens driving unit 202.

A mechanical shutter 203 and a diaphragm 204 (light quantity adjustment member) are exposure amount adjustment mechanisms that mechanically control the irradiation time of light incident on an image sensor 206. The shutter 203 and the diaphragm 204 are driven and controlled by a shutter/diaphragm driving unit 205.

A subject image that has passed through the lens unit 201 including the zoom lens is adjusted to an appropriate exposure amount by the shutter 203 and the diaphragm 204 and formed on the image sensor 206. The subject image formed on a plurality of pixels of the image sensor 206 is converted into two-dimensional digital data in the image sensor 206 and sent to an image signal processing circuit 207. Details of the image sensor 206 will be described later.

The image signal processing circuit 207 performs the count number correction process of the present embodiment and performs various image processes on the corrected signal. The image processes include, for example, a low-pass filter process for reducing noise, a shading correction process, a WB adjustment process, and the like. Furthermore, image data is generated by performing various corrections such as a defective pixel correction process, a dark shading correction process, and a dark current removal process, compression, and so forth.

An overall control calculation unit 210 controls the entire image capturing apparatus and performs various calculations. A timing generation unit (hereinafter referred to as "TG") 208 generates a drive pulse for driving the image sensor 206 based on a control signal from the overall control calculation unit 210. A first memory unit 209 temporarily stores image data.

A recording medium control interface (I/F) unit 211 records and reads image data to/from a recording medium 213 that is a removable storage medium such as a semiconductor memory. A display unit 212 displays image data and the like. An external interface (I/F) unit 214 is an interface for communicating with an external computer or the like.

A second memory unit 215 stores various parameters such as calculation results in the overall control calculation unit 210 and image shooting conditions. Information relating to driving conditions of the image capturing apparatus set by a user through an operation unit 216 is sent to the overall control calculation unit 210, and the entire image capturing apparatus is controlled based on these pieces of information.

Figure 2A:
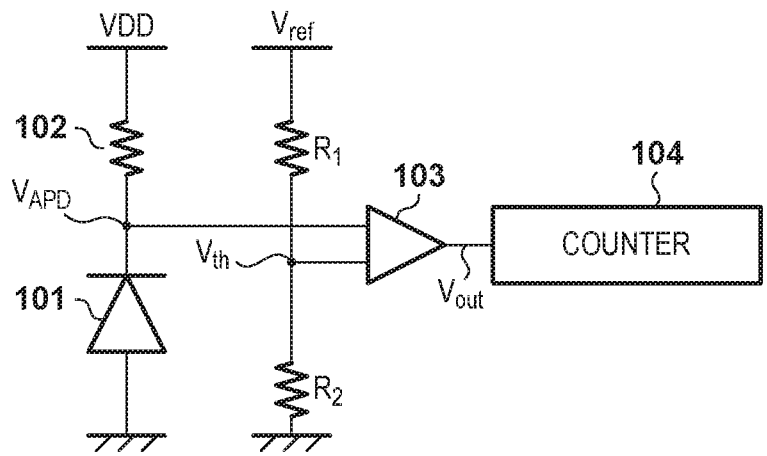
FIGS. 2A to 2C are explanatory diagrams relating to a photon counting type image sensor according to the first and second embodiments.

FIG. 2A is a circuit diagram showing a schematic configuration of each pixel in the image sensor 206 in the present embodiment. Each pixel has a sensor unit that outputs a pulse signal in response to the incidence of a photon, and a counter to count the number of output pulse signals. The image sensor 206 of this embodiment uses the avalanche phenomenon that occurs when an avalanche photodiode (APD) is operated in a Geiger mode, and measures the number of incident photons themselves and outputs the number of incident photons as a digital signal. The avalanche photodiode operated in the Geiger mode is called SPAD (Single Photon Avalanche Diode).

When the APD is operated in the Geiger mode, for example, when one photon is incident on the APD, an observable level of current is generated by an avalanche phenomenon. By converting this current into a pulse signal and counting the number of pulse signals, the number of incident photons can be directly measured. Therefore, no RTS noise is generated, and an improvement in the S/N ratio is expected.

Here, an outline of the operation of the photon counting type image sensor 206 using SPAD in the present embodiment will be described with reference to FIGS. 2A to 2C. FIG. 2A shows an equivalent circuit of a unit pixel (hereinafter referred to as "pixel") of the image sensor 206 that operates SPAD in the Geiger mode. The pixel includes an avalanche photodiode (APD) 101, a quenching resistor 102, a comparator 103, resistors $R_1$, $R_2$ and the like.

The anode end of the APD 101 is connected to GND, and the cathode end is connected to the quenching resistor 102. Then, a reverse bias voltage is applied from the voltage source VDD via the quenching resistor 102. At this time, the voltage difference between the voltages VDD and GND is set to be equal to or greater than the breakdown voltage in order to set the APD 101 to the Geiger mode.

Figure 2B:
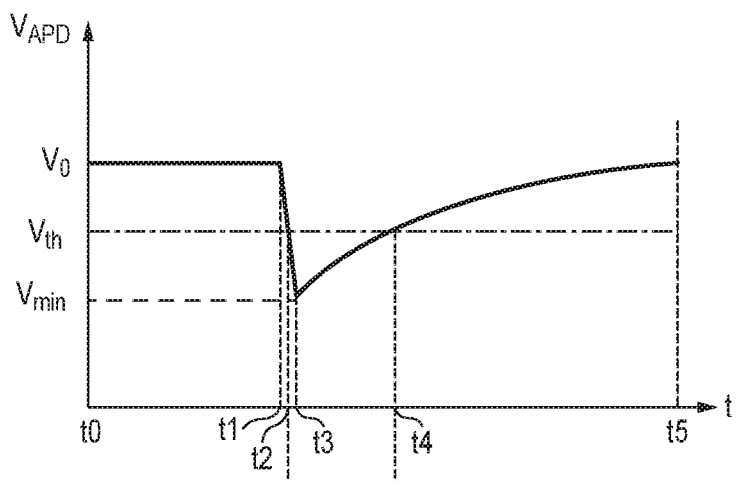

FIG. 2B shows the transition of a voltage $V_{APD}$ at the cathode end of the APD 101 until the avalanche phenomenon occurs from a photon incidence standby state and returns to the original photon incidence standby state. The period from time t0 to t1 is a photon incidence standby state, and when a photon enters the APD 101 at time t1, an avalanche phenomenon occurs. When the avalanche phenomenon occurs, a current flows, the voltage $V_{APD}$ decreases, the avalanche phenomenon stops (time t3), and the original photon incidence standby state is restored (time t5).

As illustrated in FIG. 2A, the voltage $V_{APD}$ at the cathode end of the APD 101 is input to one input terminal of the comparator 103, and a threshold voltage $V_{th}$ obtained by dividing a reference voltage $V_{ref}$ with a resistor $R_1$ and a resistor $R_2$ is input to the other input terminal. The threshold voltage $V_{th}$ is set to a potential between $V_0$ and $V_{min}$ so that a change in the voltage $V_{APD}$ can be detected when a photon enters, as described above.

The comparator 103 outputs a single pulse signal during the period from when the voltage $V_{APD}$ drops below the threshold voltage $V_{th}$ to when the voltage $V_{APD}$ once again surpasses the threshold voltage $V_{th}$ (a period in which the voltage $V_{APD}$ falls below and returns above the $V_{th}$ level).

Figure 2C:
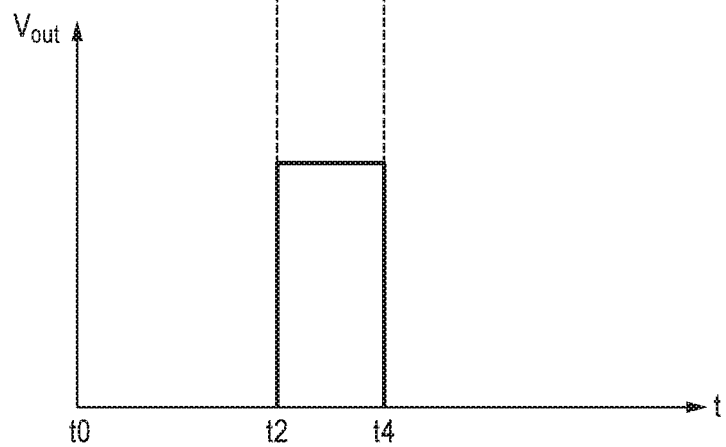

FIG. 2C shows an output $V_{out}$ of the comparator 103 when the voltage $V_{APD}$ at the cathode end of the APD 101 changes as shown in FIG. 2B. Since the voltage $V_{APD}$ becomes smaller than the threshold voltage $V_{th}$ at time t2 and the voltage $V_{APD}$ becomes greater than the threshold voltage $V_{th}$ again at time t4, one pulse signal is output during the period from t2 to t4.

By connecting a counter 104 to the comparator 103, the number of incident photons can be counted. Therefore, it is possible to measure the number of photons incident on the APD 101 by repeating a cycle in which the avalanche phenomenon occurs from the photon incident standby state, the avalanche phenomenon is stopped, and the original photon incidence standby state is restored. By outputting the count value counted by the counter 104 for a predetermined period, a pixel signal can be directly read out as a digital value.

In this way, since it is possible to obtain a digital value from each pixel, it is possible to transfer a pixel signal without deterioration of the S/N ratio due to switching noise, stray capacitance, or the like.

Figure 3:
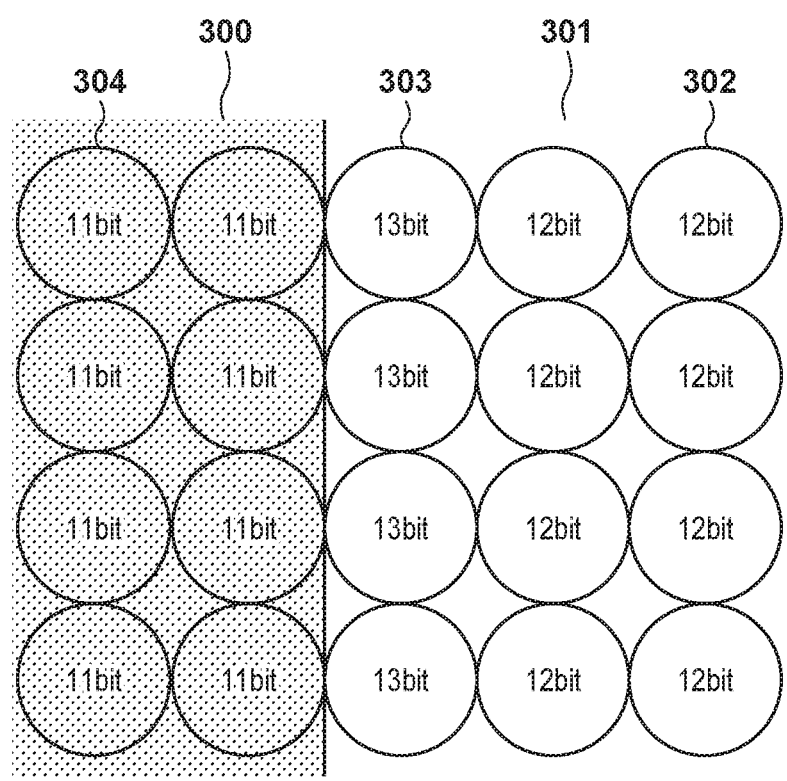
FIG. 3 is a diagram illustrating an example of the number of bits of a counter of each pixel according to the first embodiment.

FIG. 3 shows an example of the number of bits of the counter 104 of each pixel in this embodiment. In this embodiment, the counter 104 is a binary counter having a plurality of bits, and the number of bits can be designed by changing the configuration of the counter 104. An optical black (OB) region 300 on the left side of the line is shielded from light, and an exposure region 301 on the right side is exposed. A pixel 304 is a pixel in the OB region 300, and the number of bits of the counter 104 is 11, and it is possible to count up to a value of $2^{11}$. A pixel 303 is a pixel in the exposure area 301 adjacent to the OB region 300. The number of bits of the counter 104 is 13, and it is possible to count up to a value of $2^{13}$. A pixel 302 is a pixel in the exposure area 301 that is not adjacent to the OB region 300, and the number of bits of the counter 104 is 12, and it is possible to count up to a value of $2^{12}$.

In the first embodiment, as will be described later, it is assumed that a 12-bit pixel value of a pixel 302 that is not adjacent to the OB region 300 is corrected to a 13-bit pixel value in a correction circuit included in the image signal processing circuit 2017. The reason why the pixel 303 adjacent to the OB region 300 among the pixels in the exposure area 301 is 13 bits is that the correction circuit has a structure that performs correction using the adjacent pixel value read out earlier. Since it is not possible to determine whether or not the pixel 303 exceeds a maximum value CMAX using a pixel value of the pixel 304 in the OB region 300 read out before the pixel 303, the counter 104 of the pixel 303 has 13 bits so that a 13-bit pixel value can be obtained from the pixel 303 without correction.

Figure 4A:
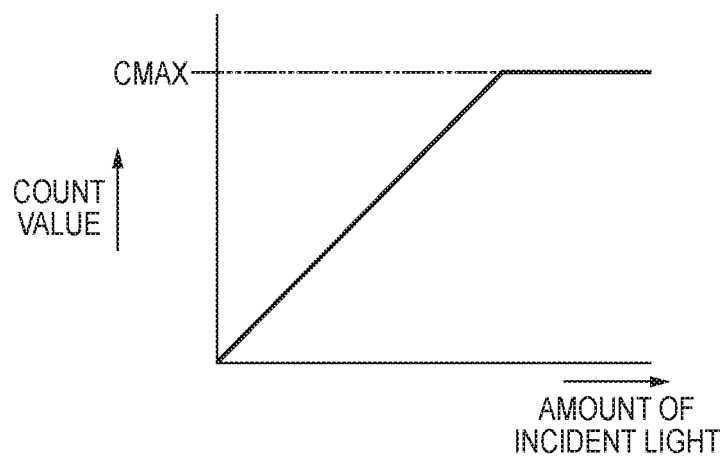
FIGS. 4A and 4B are diagrams showing a relationship between an incident light amount and a count value.
Figure 4B:
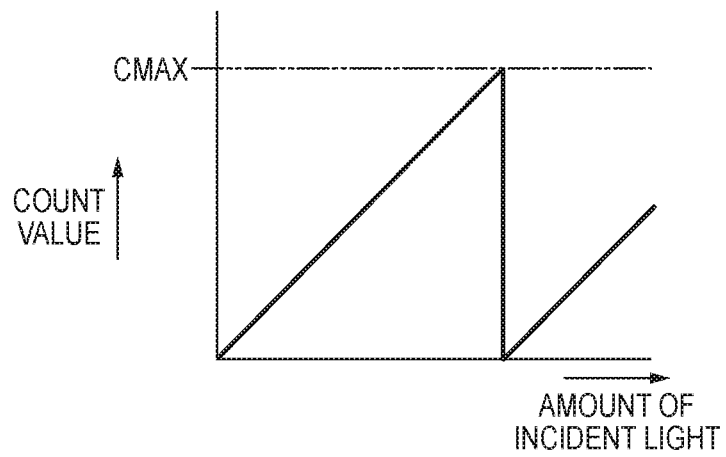

FIGS. 4A and 4B are graphs showing the relationship between the amount of light incident on the image sensor and the output (count value) of the image sensor. Here, for comparison, the graph of a conventional example is shown in FIG. 4A, and the graph of the present embodiment is shown in FIG. 4B.

As shown in FIG. 4A, conventionally, when the amount of incident light increases and the count value reaches the maximum value CMAX, the count value does not change even if light is further incident.

On the other hand, as shown in FIG. 4B, the present embodiment is characterized in that when the count value reaches the maximum value CMAX, the counter returns to 0 and continues to count without stopping. Thus, the count value obtained by returning the count value to 0 when the maximum value CMAX has reached and continuing to count is corrected by a correction circuit included in the image signal processing circuit 207 by a method described later to become a pixel value.

Next, with reference to FIG. 5A, pixel signals obtained from the pixels 302 and 303 in the exposure area 301 of the image sensor 206 when counting is performed as shown in FIG. 4B with the number of bits as shown in FIG. 3 will be described.

Figure 5A:
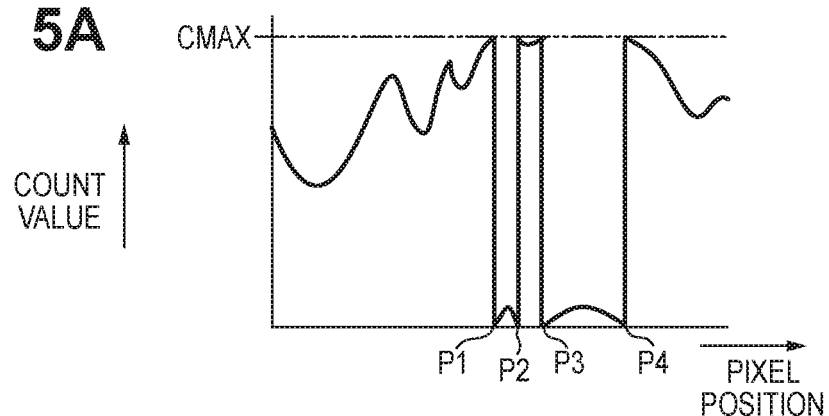
FIGS. 5A to 5D are diagrams showing examples of count values and corrected pixel values of an arbitrary row according to the first embodiment.

In FIG. 5A, the vertical axis indicates the output values in an arbitrary row of the image sensor 206, that is, the count values output from the counters 104, and the horizontal axis indicates the pixel positions in the horizontal direction.

P1 to P2 and P3 to P4 indicate pixel ranges where the count values exceed the maximum value CMAX. The signal having the maximum value CMAX in the pixels at positions immediately before the pixel positions P1 and P3, whereas signal fluctuates in the vicinity of zero in the pixel ranges P1 to P2 and P3 to P4. The correction circuit corrects the count values in such pixel ranges P1 to P2 and P3 to P4.

Figure 6:
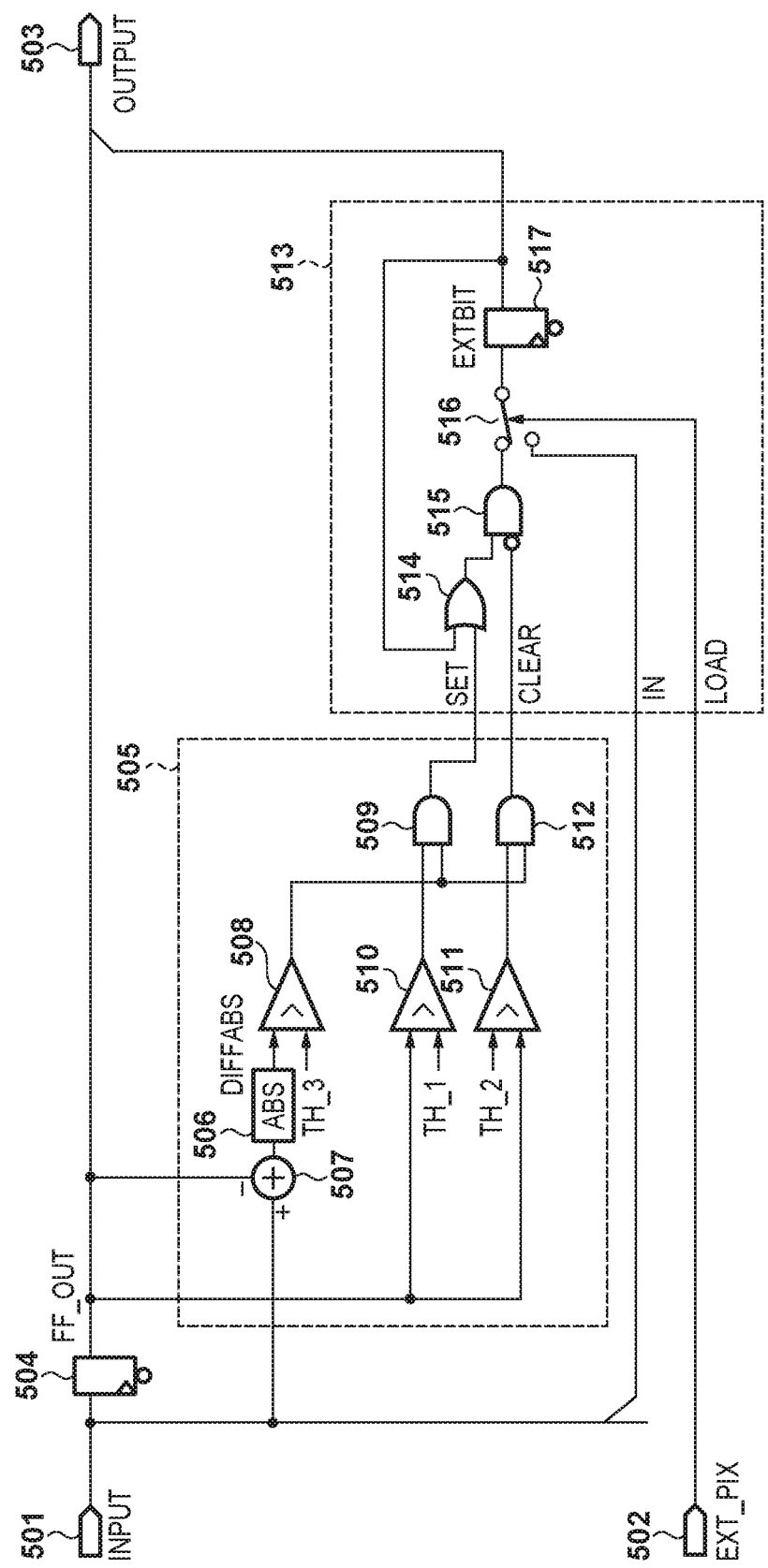
FIG. 6 is a diagram illustrating a configuration example of a correction circuit included in an image signal processing circuit according to the first embodiment.

FIG. 6 is a circuit diagram of a correction circuit included in the image signal processing circuit 207 in the first embodiment. The count value read from the image sensor 206 is sequentially input from a terminal 501 for one pixel per cycle. The image sensor 206 and the correction circuit are connected using a protocol including data compression, and, in the correction circuit, the count value for one pixel per cycle is transferred with 13 bits (bits 0 to 12) for every pixel. Therefore, the $12^{th}$ bit of the 12-bit count value of the pixel 302 and the $11^{th}$ and $12^{th}$ bits of the 11-bit count value of the pixel 304 are stuffed with 0.

The count value input from the terminal 501 is taken into a delay element 504 and delayed by one cycle. Then, the count value of the next pixel is input at the same timing as the timing at which the count value delayed by one cycle by the delay element 504 is output. Thereafter, the count value is sequentially input and output after being delayed by one cycle by the delay element 504. Of the count values input from the terminal 501, the value of the added $12^{th}$ bit (most significant bit) is also output to one terminal b of a switch 516.

Further, a signal EXT_PIX which becomes 1 when the count value of the pixel 303 is input is generated in the correction circuit and input from a terminal 502. When the signal EXT_PIX is 0, the switch 516 selects a terminal a, and when the signal EXT_PIX is 1, the switch 516 selects the terminal b. Therefore, when the signal EXT_PIX is 1, the value of the bit 12 of the pixel 303 input to the terminal b is selected, and in the other cases, the output of an AND circuit 515 input to the terminal a is selected, and the selected value is send to a following delay element 517.

A detection circuit 505 is a circuit for detecting whether or not the count value is a value re-counted after exceeding the maximum value CMAX. Further, a correction circuit 513 is a circuit that corrects a count value by setting 1 to the $12^{th}$ bit (most significant bit) in a case where the count value is a value that is re-counted after exceeding the maximum value CMAX, and sets 0 otherwise. The detection circuit 505 and the correction circuit 513 will be described in detail below.

In the detection circuit 505, a subtractor 507 subtracts a count value delayed by one cycle by the delay element 504 (hereinafter referred to as "delayed count value") from a count value of the current cycle (hereinafter referred to as "current count value"), and an absolute value conversion unit 506 sets the obtained difference to a positive value. Then, a first comparison unit 508 determines whether the output of the absolute value conversion unit 506 exceeds a threshold value TH_3 by comparison.

Further, a second comparison unit 510 determines whether or not the delayed count value exceeds a threshold value TH_1 by comparison, and a third comparison unit 511 determines whether or not the delayed count value is below a threshold value TH_2 by comparison.

An AND circuit 509 outputs "true" when the comparison results of the first comparison unit 508 and the second comparison unit 510 are both "true". Further, an AND circuit 512 outputs "true" when the comparison results of the first comparison unit 508 and the third comparison unit 511 are both "true".

Next, the operation of the correction circuit 513 will be described. An OR circuit 514 calculates a logical sum of the outputs of the delay element 517 and the AND circuit 509 and outputs the logical sum to the AND circuit 515. The AND circuit 515 outputs a logical product of the output of the AND circuit 509 and the inverting output of the AND circuit 512.

As described above, the switch 516 selects the terminal a when the signal EXT_PIX is 0, and selects the terminal b when the signal EXT_PIX is 1, and outputs the output of the selected terminal a or b to the delay element 517. The delay element 517 delays the input signal by one cycle, and output the delayed signal.

The value output from the delay element 517 is output as the $12^{th}$ bit of the output of the output terminal 503 by being bundled with $0^{th}$ to $11^{th}$ bits of the delayed count value.

In the correction circuit having the above configuration, in the cycle in which the output of the AND circuit 509 is true, the output of the AND circuit 512 always indicates "false", and its inverted input, namely a "true" signal, is input to one terminal of the AND circuit 515. Accordingly, since "true", which is the logical sum of the outputs of the delay element 517 and the AND circuit 509, is transmitted to the subsequent stage by the AND circuit 515, when the terminal a of the switch 516 is selected, an output of the delay element 517 of the next cycle becomes "true".

If the output of the AND circuit 512 indicates "true", the output of the AND circuit 509 always indicates "false". In this case, the AND circuit 515 receives "false" that is the inverting output of the AND circuit 512, so the output always indicates "false" regardless of the output of the OR circuit 514, and the output of the delay element 517 in the next cycle becomes "false".

Further, when the signal EXT_PIX input to the control terminal of the switch 516 from the terminal 502 becomes 1 at the timing when the count value of the pixel 303 is input, the value is switched to the value of the $12^{th}$ bit of the count value of the pixel 303 input from the terminal 501. Therefore, the output of delay element 517 in the next cycle is the value of the $12^{th}$ bit of the count value input from the terminal 501.

Furthermore, when the comparison result of the first comparison unit 508 is "false", that is, when the difference between the signals is small, the outputs of the AND circuit 509 and the AND circuit 512 becomes "false", and "false" which is the inverting output of the AND circuit 512 is input to the AND circuit 515. Therefore, with the OR circuit 514 the output of the delay element 517 becomes the output of the AND circuit 515, and the output of the delay element 517 one cycle before is held.

In this way, by setting 1 or 0 to the $12^{th}$ bit of the 13-bit count value input to the correction circuit according to conditions, it becomes possible to obtain a 13-bit signal from a 12-bit pixel signal.

Figure 7:
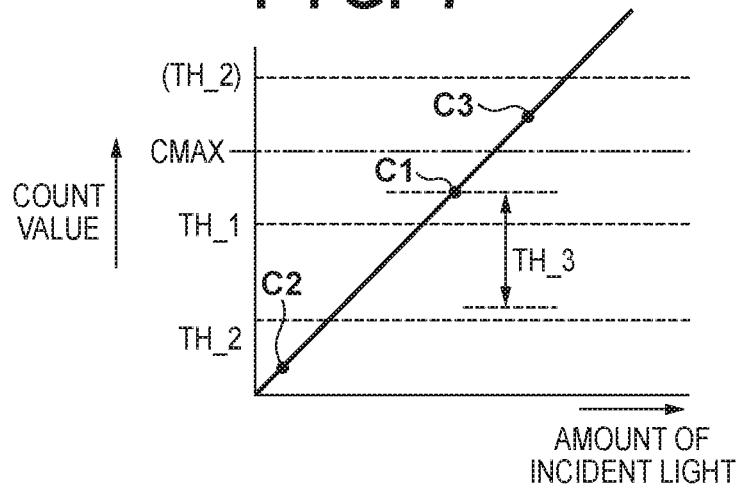
FIG. 7 is a diagram for explaining a relationship between a count value and a detection result according to the first embodiment.

Here, the threshold values TH_3, TH_1, and TH_2 of the first to third comparison units 508, 510, and 511 and detection results in the detection circuit 505 will be described with reference to FIG. 7. In FIG. 7, the horizontal axis represents the amount of incident light, and the vertical axis represents the output (count value) of the image sensor 206.

As shown in FIG. 7, when the delayed count value is C1, the current count value is C2, and the threshold value TH_3 of the first comparison unit 508 has the range shown in the figure, the output of the absolute value conversion unit 506 exceeds the range of the threshold value TH_3 and the output of the first comparison unit 508 becomes "true". In this way, in a case where the difference between the continuously input count values exceed the range of the predetermined threshold TH_3 the condition 1 indicating that the maximum value CMAX is exceeded is satisfied.

Here, the reason for the determination as described above will be briefly described. In a case where the image sensor 206 is a color sensor, pixels of the same color exist discretely, and therefore an optical low-pass filter is attached to the surface of the image sensor for the purpose of preventing false colors due to aliasing. Furthermore, the adjacent pixels have a certain correlation due to various factors such as the occurrence of crosstalk between the adjacent pixels optically, and therefore, the difference between the adjacent pixels hardly exceed a certain value.

Therefore, in a case where the threshold value TH_3 is set in consideration of characteristics of an optical low-pass filter, for example, and the difference between count values of adjacent pixels exceeds the set threshold value TH_3, it can be considered that one of the count values exceeds the maximum value CMAX. Accordingly, a condition that the difference between adjacent pixels exceeds the threshold TH_3 is defined as the condition 1.

Further, since the delayed count value C1 exceeds the threshold value (condition 2), the output of the second comparison unit 510 indicates "true", the output of the AND circuit 509 also indicates "true", and the output of the OR circuit 514 also indicates "true". In addition, since the delayed count value C1 exceeds the threshold value TH_2, the output of the third comparison unit 511 indicates "false", and the output of the AND circuit 512 also indicates "false". As a result, the output of the AND circuit 515 becomes "true", which is delayed by one cycle by the delay element 517, and 1 is set in the $12^{th}$ bit of the current count value. When 1 is set in the $12^{th}$ bit, the current count value C2 is converted to the count value C3.

Here, the threshold value TH_1 and the threshold value TH_2 are set to values at which a predetermined amount larger or smaller than the maximum value CMAX can be detected. Regarding the threshold value TH_2, when the maximum value CMAX is exceeded, the count value is returned to 0 and the count s continued. Therefore, the value with the $12^{th}$ bit being 0 is set as the threshold value TH_2 used for actual comparison.

On the other hand, when the delayed count value is C2 and the current count value is C1, the output of the absolute value conversion unit 506 exceeds the threshold value TH_3, so the output of the first comparison unit 508 indicates "true. Further, since the count value C2 is below the threshold value TH_2 (condition 3), the output of the third comparison unit 511 indicates "true", the output of the AND circuit 512 also indicates "true", and "false", which is the inverting output of the AND circuit 512, is input to the AND circuit 515. As a result, regardless of the output of the OR circuit 514, the output of the AND circuit 515 becomes "false", which is delayed by one cycle by the delay element 517, and 0 is set to the $12^{th}$ bit of the current count value. When 0 is set in the $12^{th}$ bit, the current count value C1 is output from the correction circuit as it is without being converted.

Thus, when the value of the $12^{th}$ bit is set to 1 or 0 by the correction circuit 513, unless a significant change in the signal value is detected by the detection circuit 505, or 1 is input as the signal EXT_PIX from the terminal 502, the set value is retained.

The following is conditions and operations corresponding to the algorithms implemented by a circuit illustrated as the circuit diagram of FIG. 6.

Condition 1: The absolute value of the difference between adjacent pixels is greater than TH_3.
Condition 2: A delayed count value is greater than TH_1.
Condition 3: A delayed count value is smaller than TH_2.
Condition 4: A count value of pixel 303 is input.
Processing condition 1: If the condition 1 and condition 2 are satisfied, the $12^{th}$ bit is set to 1.
Processing condition 2: If the condition 1 and condition 3 are satisfied, the $12^{th}$ bit is set to 0.
Processing condition 3: If the condition 4 is satisfied, set the value of the $12^{th}$ bit of pixel 303.
Processing condition 4: If none of the conditions is satisfied, the set value of the $12^{th}$ bit is retained.

Figure 5B:
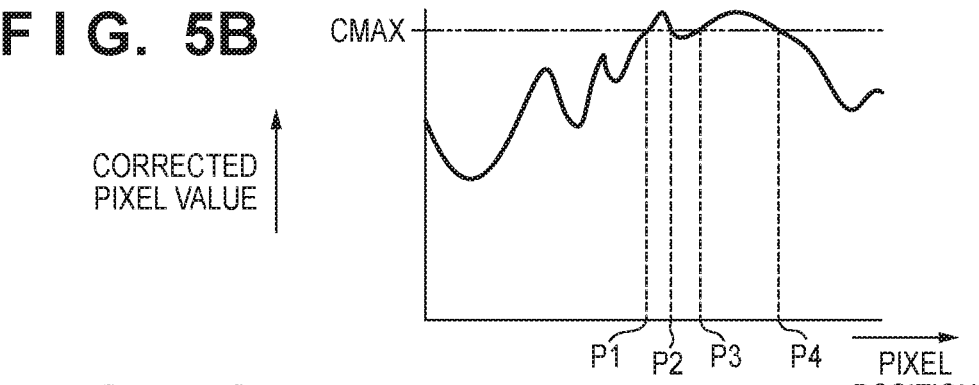

FIG. 5B is a signal in a state in which parts of the signal count values shown in FIG. 5A exceeding the maximum value CMAX are corrected using the correction circuit that performs the above-described processing. It can be seen that the pixel ranges P1 to P2 and P3 to P4 are raised above the maximum value CMAX.

Figure 8:
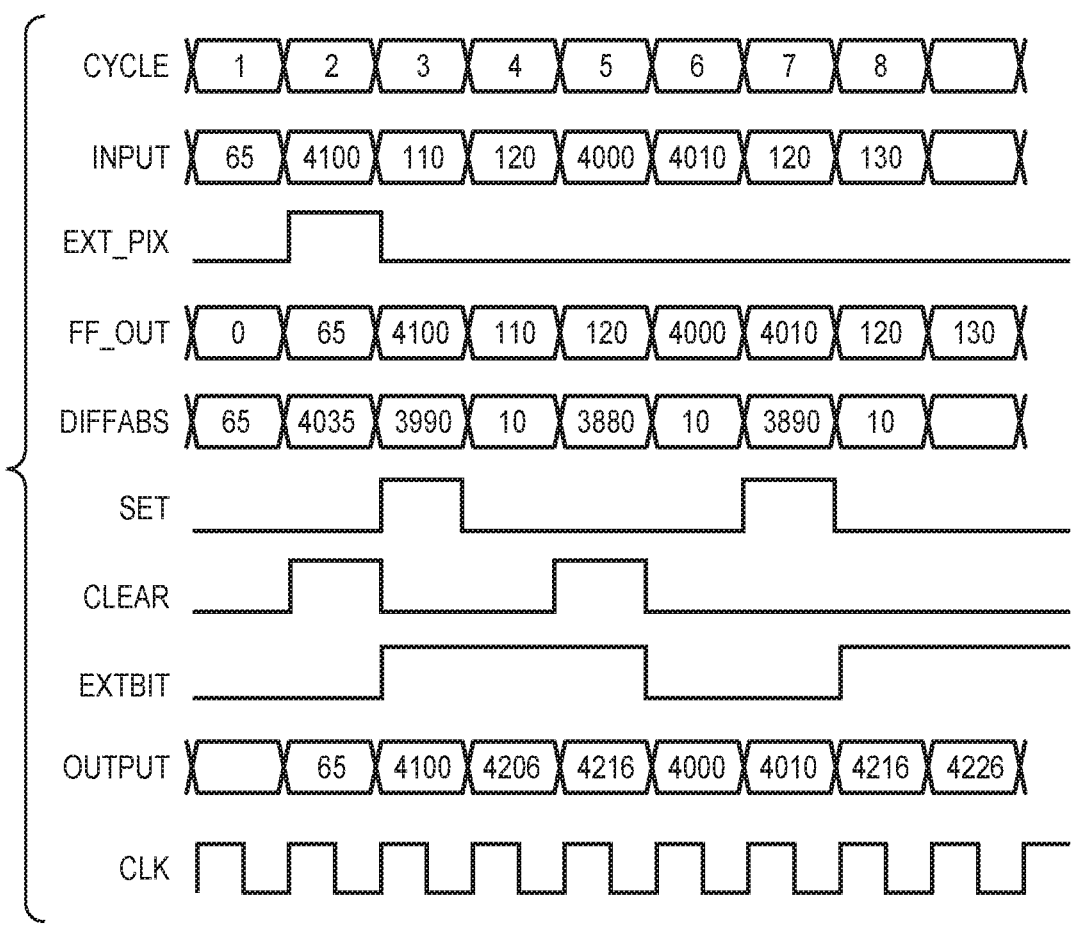
FIG. 8 is a timing chart showing signals at various parts according to the first embodiment.

Next, with reference to the timing chart of FIG. 8, the signals of the respective parts in the correction circuit shown in FIG. 6 will be specifically described.

In FIG. 8, CYCLE indicates the number of cycles. INPUT is a signal input from the input terminal 501, EXT_PIX is a signal input from the input terminal 502, FF_OUT is an output of the delay element 504, and DIFFABS is an output of the absolute value conversion unit 506. Also, SET is an output of the AND circuit 509, CLEAR is an output of the AND circuit 512, EXTBIT is an output of the delay element 517, OUTPUT is an output of the output terminal 503, and CLK is a block signal which is shared by the delay elements 504 and 517 and upper layer circuit blocks.

Note that 0 is set in the delay element 517 as an initial value so that 0 is output as the output of the correction circuit 513.

The first cycle is an 11-bit signal of the pixel 304 in the OB area 300, and valid information is up to the $10^{th}$ bit, and the $11^{th}$ and $12^{th}$ bits always contain 0. If there is no signal input as INPUT earlier than this, DIFFABS becomes "false", and the values of SET and CLEAR both become "false". Since 0 is set in the delay element 517 as an initial value, this value is held, and as a result, the OUTPUT in the second cycle becomes 65.

When a value 4100, having 1 in the $12^{th}$ bit, which is a count value of the pixel 303 is input as INPUT in the second cycle, since EXT_PIX is 1 and the condition 4 is satisfied, 1 is output as EXTBIT in the next third cycle. Accordingly, the value of OUTPUT in the third cycle becomes 4100.

Although a small value of 110 is input as INPUT in the third cycle, since EXT_PIX is 0, and thus EXTBIT changes according to the values of SET and CLEAR, instead of the $12^{th}$ bit of the input count value. The value of DIFFABS, which is the difference from the FF_OUT value of 4100 of the adjacent pixel, is 4035 and is larger than the threshold value TH_3, and the FF_OUT value 4100 is larger than the threshold values TH_1 and TH_2, so that SET becomes 1 and CLEAR becomes 0. As a result, EXTBIT of the next cycle becomes 1. As a result, the value of OUTPUT in the fourth cycle is output as 4206 in which the $12^{th}$ bit has a value of 1.

The INPUT in the next fourth cycle has a small value of 120, but DIFFABS does not exceed the threshold value TH_3, so both SET and CLEAR becomes 0. As a result, the EXTBIT of the next fifth cycle retains the value of the fourth cycle and remains 1, and the value of OUTPUT becomes 4216.

In the fifth cycle, when a very large value of 4000 is input to INPUT, DIFFABS also greatly increases to 3880, exceeding the threshold value TH_3. On the other hand, since FF_OUT is 120 which is input in the fourth cycle and is smaller than the threshold values TH_1 and TH_2, SET becomes 0 and CLEAR becomes 1. As a result, regardless of the output of the OR circuit 514, the output of the AND circuit 515 becomes "false", and EXTBIT of the next cycle becomes zero. As a result, the value of OUTPUT in the sixth cycle is 4000 where the $12^{th}$ bit is 0.

Thereafter, the process corresponding to the input values of INPUT and EXT_PIX is repeated.

Thus, the FF_OUT of the delay element 504 changes abruptly from 4100 to 110, 120, and 4000 over the third to sixth cycles. However, OUTPUT, which is the correction result obtained by synthesizing EXBIT, changes from 4100 to 4206, 4216, and 4000, whose change in amplitude is not abrupt.

The method for obtaining a 13-bit signal from a 12-bit pixel has been described above as an example. However, the present invention is not limited by the number of bits of the counter 104, and the number of bits other than 12 bits or 13 bits may be used.

According to the first embodiment as described above, a signal exceeding the number of bits of the counter in the pixel can be obtained.

In the first embodiment, whether or not the count value exceeds the maximum value CMAX is determined by comparison with a signal input one cycle before, but the present invention is not limited to this. For example, the comparison may be performed with a count value obtained from upper or lower adjacent pixels, or with a count value obtained from a corresponding pixel one frame before. In such cases, it is possible to adopt a configuration that does not include a pixel, such as the pixel 303, which does not require the correction.

Further, in the case of a color image sensor covered with a color filter, since the correlation between the same color pixels is high, detection may be performed using pixels of the same color in the vicinity as reference pixels. Alternatively, as the spatial frequency of hue and saturation is low with respect to luminance, whether or not the count value is over the maximum value CMAX and recounted may be determined by detecting the difference between the color of the pixel of interest and the surrounding color (luminance ratio between pixels of different colors).

Further, in the above-described example, as the condition 2 and the condition 3, the determination is made by comparing the delayed count value with the threshold values. However, the current count value may be compared with the threshold value instead.

Further, although a larger number of bits is assigned to the pixels 303 adjacent to the OB region 300 in FIG. 3 of the first embodiment comparing to other pixels, the number of bits of the pixels 303 may be reduced by configuring a filter with low transmittance or by setting the photoelectric conversion sensitivity of the APD 101 to be low, so that the maximum value is hardly reached, and correction by multiplying a coefficient may be performed by the correction circuit.

Further, the transistor portion of the counter 104 of each pixel in the first embodiment may have the same design for all pixels, and pixels having a larger number of bits and pixels having a smaller number of bits may be constituted using a wiring layer.

In the first embodiment described above, the photocounting type image sensor using SPAD has been described as the image sensor 206. However, the image sensor 206 is not limited to this, and the present invention can be applied to any photon counting type image sensor. For example, a photon counting type image sensor using CMOS may be used.

First Modification

In the above-described example, a case where a 13-bit count value is obtained from a 12-bit count value has been described. However, a 13-bit count value can also be obtained from an 11-bit count value.

Figure 5C:
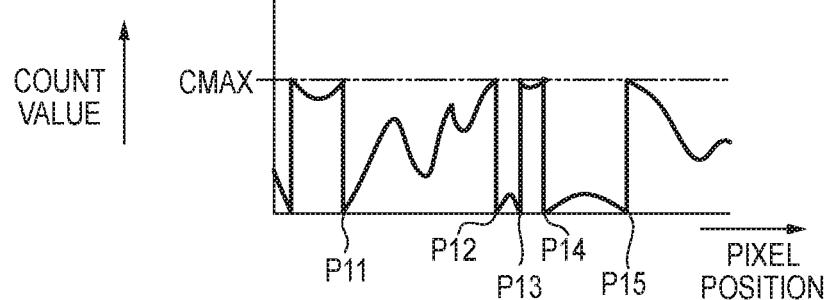
Figure 5D:
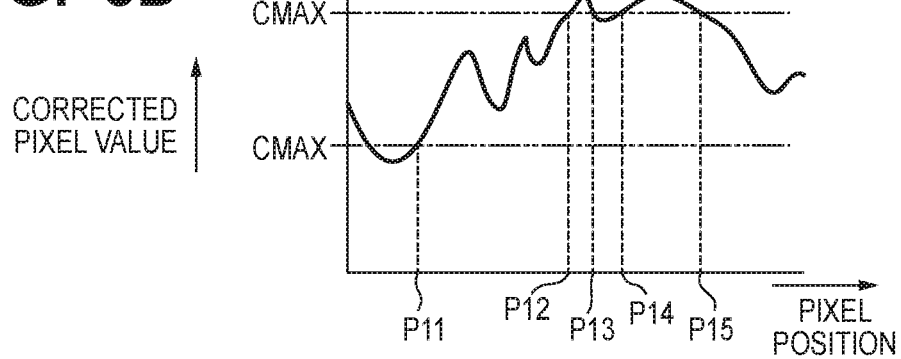

FIG. 5C shows an 11-bit count value obtained from the counter 104, and FIG. 5D shows a relationship between the video signal and the maximum count value CMAX when a 13-bit pixel value is obtained from the 11-bit count value shown in FIG. 5C. In the example shown in FIG. 5C, after exceeding the maximum value CMAX at the pixel position P11, the count value exceeds the maximum value CMAX again at the pixel positions P12 and P14. A portion corrected by exceeding the maximum value CMAX in the pixel range P11 to P12 in FIG. 5C has a waveform as shown by a pixel range P11 to P12 in FIG. 5D, and a portion exceeding the maximum value CMAX again in the pixel ranges P12 to P13 and P14 to P15 in FIG. 5C is further corrected to waveforms as shown by pixel ranges P12 to P13 and P14 to P15 in FIG. 5D. In this way, in a case of obtaining a 13-bit signal from an 11-bit pixel, the maximum value CMAX may be exceeded twice, but correction can be made in the same way as in the first embodiment.

Second Modification

Figure 9A:
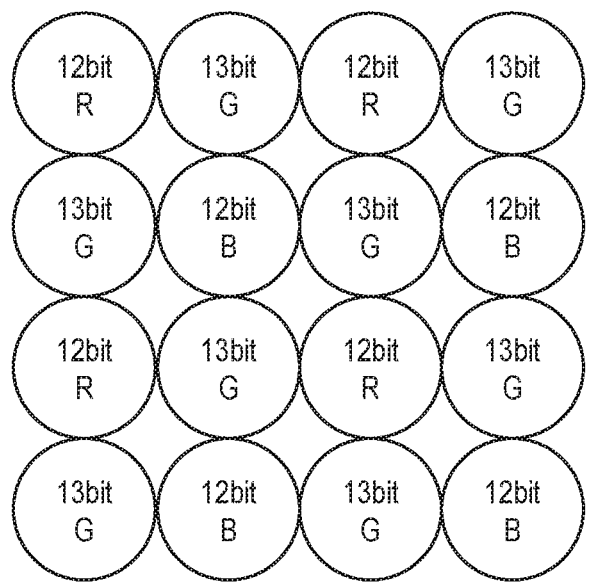
FIGS. 9A to 9C are diagrams illustrating pixel arrangement examples according to a second modification.
Figure 9B:
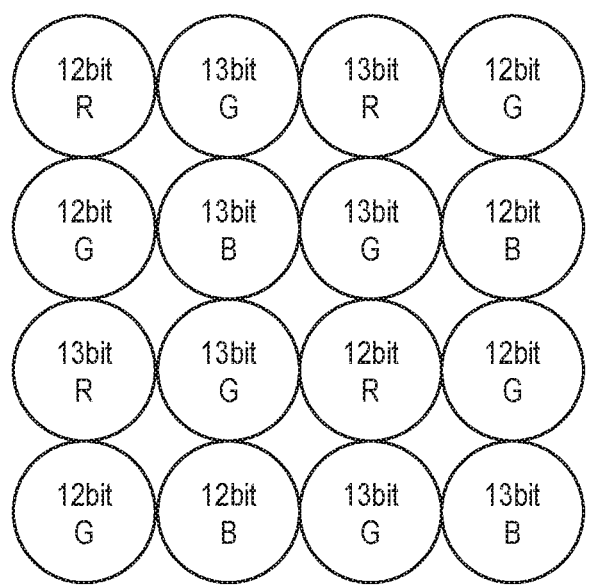
Figure 9C:
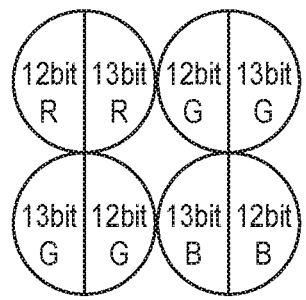

FIGS. 9A to 9C show examples of pixel arrangement. FIG. 9A shows an image sensor covered with a color filter, in which 13 bits are assigned to green pixels (first color pixels) and 12 bits are assigned to red and blue pixels (pixels other than the first color). Since the amount of blue light tends to be less than green, a smaller number of bits is assigned. If a count value exceeds the maximum number CMAX, it can be corrected by the correction circuit described in the first embodiment.

In FIG. 9B, 13-bit pixels and 12-bit pixels are arranged for each color. When correction is performed with reference to pixels of the same color, 13-bit pixels arranged at regular intervals can be used.

FIG. 9C shows an example in which two pixels are arranged for one microlens. By using such pixels, it is possible to obtain pupil-divided images. Pixels having different bits can be used as pixels sharing the same microlens.

Second Embodiment

Figure 10:
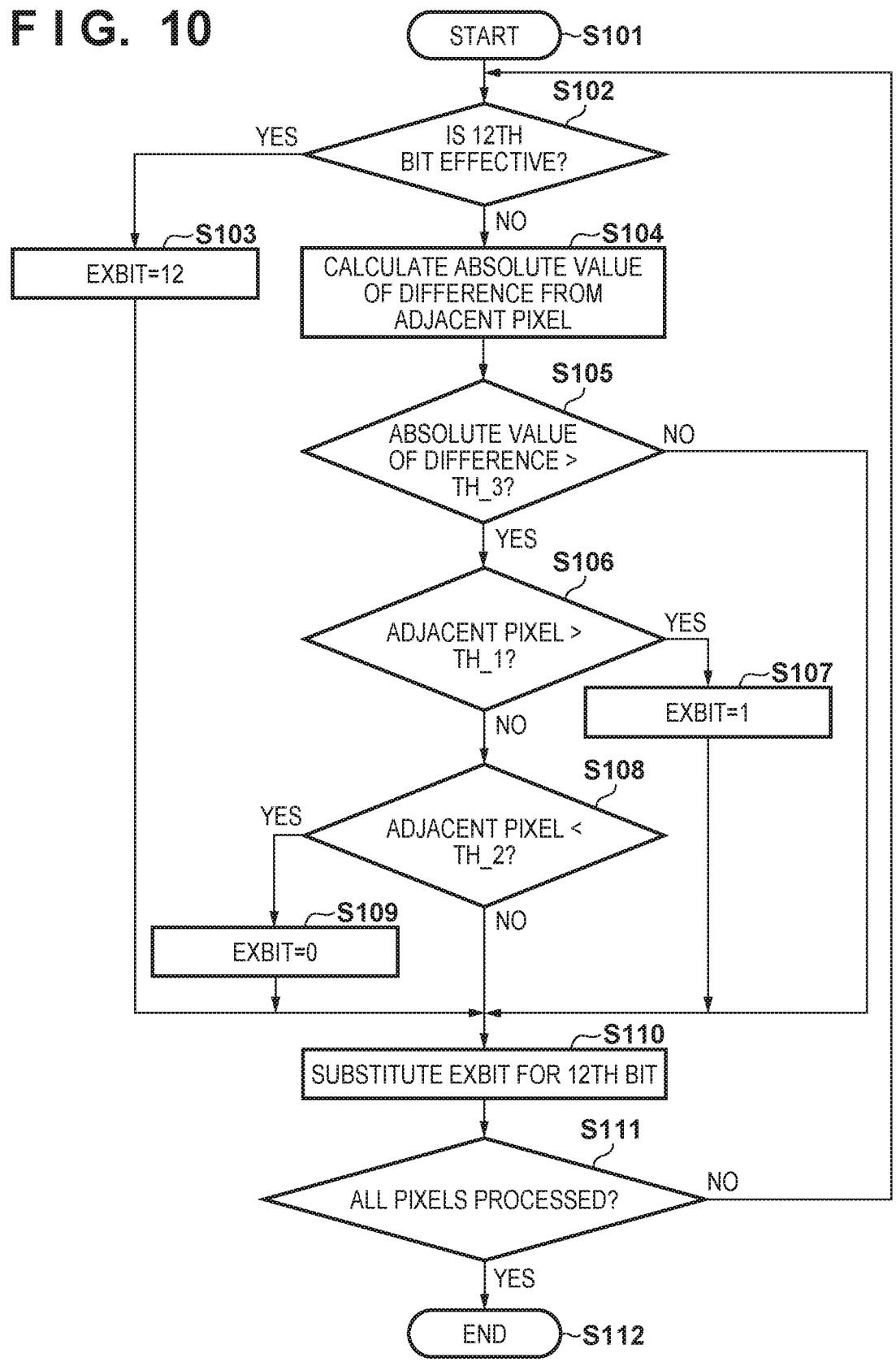
FIG. 10 is a flowchart showing processing in the second embodiment.

Next, image signal processing according to the second embodiment of the present invention will be described with reference to FIG. 10. In the second embodiment, a computer program detects whether a count value is a value that has been recounted beyond the maximum value CMAX of the count value and performs bit correction. Also in the second embodiment, a case where a 12-bit count value is corrected to a 13-bit count value will be described. In the following description, the thresholds TH_1, TH_2, and TH_3 are the same as those shown in FIG. 7.

When processing is started in step S101, it is checked in step S102 whether or not a valid value exists in the $12^{th}$ bit of the pixel of interest. In the first embodiment, the signal EXT_PIX is input from the terminal 502, but in the second embodiment, the signal EXT_PIX is determined by the position in the array. If a valid value (1) exists in the $12^{th}$ bit, the process proceeds to step S103, and if not, the process proceeds to step S104. The process of step S103 corresponds to the processing condition 3 described above.

In step S103, the value (1) of the $12^{th}$ bit of the pixel of interest is stored as a variable EXBIT. The variable EXBIT is a variable corresponding to the output of the element 517 of the first embodiment, and is attached to the final output.

On the other hand, if there is no valid value in the $12^{th}$ bit in step S102, the process proceeds to step S104, and the absolute value of the difference from the adjacent pixel is calculated.

In step S105, it is determined whether or not the absolute value of the difference is larger than the threshold value TH_3. If the absolute value of the difference is larger than the threshold value TH_3, the condition 1 is satisfied, so that the process proceeds to step S106 and it is checked whether the next condition is satisfied. If the absolute value of the difference is equal to or smaller than the threshold value TH_3, the process proceeds to step S110. This processing corresponds to the processing condition 4 described above.

In step S106, it is checked whether or not the adjacent pixel is larger than the threshold value TH_1. If the adjacent pixel is larger than the threshold value TH_1, the condition 2 is satisfied, so the process proceeds to step S107, and 1 is set to EXBIT This processing corresponds to the processing condition 1 described above.

If the adjacent pixel is equal to or smaller than the threshold value TH_1, the next condition is checked in step S108. In step S108, it is checked whether or not the adjacent pixel is smaller than the threshold value TH_2. If the adjacent pixel is smaller than the threshold value TH_2, the condition 3 is satisfied, so the process proceeds to step S109, and 0 is set to EXBIT. This processing corresponds to the processing condition 2 described above. If the adjacent pixel is not smaller than the threshold TH_2, the process proceeds to S110 as it is. This processing corresponds to the processing condition 4 described above.

With the above processes, the process proceeds to step S110 after any of steps S103, S105, S107, S108, and S109. In step S110, the value of the variable EXBIT is substituted into the $12^{th}$ bit of the pixel of interest.

Then, in step S111, it is determined whether or not processing has been completed for all the pixels. If the processing has not been completed for all the pixels, the processing of the flowchart in FIG. 10 is performed for all the pixels by shifting the position of the pixel of interest for each row. Note that since the count value of the adjacent pixel referred to in the flowchart of FIG. 10 is a count value before correction, it is assumed that the processed count value is stored in another memory or the like.

According to the second embodiment as described above, the same effect as that of the first embodiment can be obtained by processing by a computer program.

The above processing may be performed by the image signal processing circuit 207 or may be performed by the overall control calculation unit 210. Alternatively, the count values may be output from the image capturing apparatus without correction, and an external information processing apparatus may receive the count values and perform the above processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-045134, filed on Mar. 12, 2019 which is hereby incorporated by reference herein in its entirety.

What is claimed is:

1. An information processing apparatus comprising one or more processors and/or circuitry which functions as:
   a correction unit that sequentially receives count values of a plurality of pixels of an image sensor and corrects signal values based on the count values, the image sensor having the plurality of pixels each of which has a sensor that outputs a pulse signal in response to an incident of a photon and a counter that counts the number of pulse signals to generate the count values,
   wherein, in a case where a count value reaches a predetermined value, the counter resets the count value and continues counting, and
   wherein, in a case where a count value is obtained by continuing counting after the count value is reset, the correction unit corrects the signal values based on the count value.

2. The information processing apparatus according to claim 1, wherein the correction unit determines whether or not to correct each of the signal values based on the count values sequentially received from the plurality of pixels based on the count value of an adjacent pixels.

3. The information processing apparatus according to claim 1, wherein, during a first period since any of first count values which are sequentially input from the plurality of pixels and second count values output from the pixels adjacent to the pixels that output the first count values satisfy a predetermined first condition until any of the first count values and the second count values satisfy a predetermined second condition, the correction unit adds a value corresponding to the maximum value to a first signal value based on the first count value.

4. The information processing apparatus according to claim 3, wherein the counter is a binary counter of a plurality of bits, and
   wherein the correction unit corrects the first signal value by adding 1 as a most significant bit to the first count value during the first period.

5. The information processing apparatus according to claim 3, wherein the correction unit corrects the first signal value by adding 0 as a most significant bit to the first count value during a period except for the first period.

6. The information processing apparatus according to claim 3, wherein the counter is a binary counter of a plurality of bits,
   the plurality of pixels include a pixel having the counter that outputs a count value of a first number of bits and a pixel having the counter that outputs a count value of a second number of bits which is larger than the first number of bits, and
   in a case where a count value of the second number of bits is input, the correction unit does not correct a signal value based on the count value.

7. The information processing apparatus according to claim 3, wherein the first condition is that a difference between the first count value and the second count value is greater than a predetermined first threshold value and the second count value is greater than a predetermined second threshold value.

8. The information processing apparatus according to claim 7, wherein the second condition is that a difference between the first count value and the second count value is greater than a predetermined first threshold value and the second count value is smaller than a predetermined third threshold value which is smaller than the second threshold value.

9. The information processing apparatus according to claim 2, wherein the plurality of pixels are respectively covered with color filters of a plurality of colors, and the adjacent pixel indicates a neighboring pixel of the same color.

10. The information processing apparatus according to claim 1, wherein the plurality of pixels are respectively covered with color filters of a plurality of colors, and
    the correction unit determines whether or not the received count value is obtained by continuing counting after the count value is reset based on a luminance ratio between adjacent pixels of a different color.

11. The information processing apparatus according to claim 1, wherein the sensor includes an avalanche photodiode.

12. The information processing apparatus according to claim 1, wherein, in a case where a count value reaches a maximum value, the counter resets the count value to 0 and continues counting.

13. An image sensor including a plurality of pixels, each of which comprising:
   a sensor that outputs a pulse signal in response to incident of a photon; and
   a counter that counts the number of pulse signals, wherein the counter is a binary counter of a plurality of bits;
   wherein, in a case where a count value reaches a predetermined value, the counter resets the count value and continues counting; and
   wherein the plurality of pixels are respectively covered with color filters of a plurality of colors, and the counter of a pixel corresponding to the color filter of the first color among the plurality of colors output a count value having a larger number of bits than the counter of a pixel corresponding to the color filter of a color other than the first color.

14. The image sensor according to claim 12, wherein the sensor includes an avalanche photodiode.

15. An image capturing apparatus comprising:
   an image sensor including a plurality of pixels, each of which comprising:
      a sensor that outputs a pulse signal in response to incident of a photon; and
      a counter that counts the number of pulse signals and generates a count value,
      wherein, in a case where the count value reaches a predetermined value, the counter resets the count value and continues counting; and
   an information processing apparatus comprising one or more processors and/or circuitry which functions as:
      a correction unit that sequentially receives count values of a plurality of pixels of the image sensor and corrects signal valued based on the count values,
      wherein, in a case where a count value reaches a predetermined value, the counter resets the count value and continues counting, and
      wherein, in a case where a count value is obtained by continuing counting after the count value is reset, the correction unit corrects the signal values based on the count value.

16. An information processing method comprising:
   sequentially receiving count values of a plurality of pixels of an image sensor having the plurality of pixels each of which has a sensor that outputs a pulse signal in response to an incident of a photon and a counter that counts the number of pulse signals and generates the count values,
   correcting signal values based on the count values,
   wherein, in a case where a count value reaches a predetermined value, the count value is reset and the counting is continued, and
   wherein, in a case where a count value is obtained by continuing counting after the count value is reset, the signal values based on the count value is corrected.

17. A non-transitory computer-readable storage medium, the storage medium storing a program that is executable by the computer, wherein the program includes program code for causing the computer to function as an image processing apparatus comprising one or more processors and/or circuitry which functions as:
   a correction unit that sequentially receives count values of a plurality of pixels of an image sensor and corrects signal values based on the input count values, the image sensor having the plurality of pixels each of which has a sensor that outputs a pulse signal in response to an incident of a photon and a counter that counts the number of pulse signals to generates the count values,
   wherein, in a case where a count value reaches a predetermined value, the counter resets the count value and continues counting, and
   wherein, in a case where an input count value is obtained by continuing counting after the count value is reset, the correction unit corrects the signal values based on the count value.

* * * * *